No. 710,894. Patented Oct. 7, 1902.
A. ROBINSON.
APPARATUS FOR TURNING TERRA COTTA PIPES.
(Application filed Mar. 29, 1902.)
(No Model.) 3 Sheets—Sheet 2.
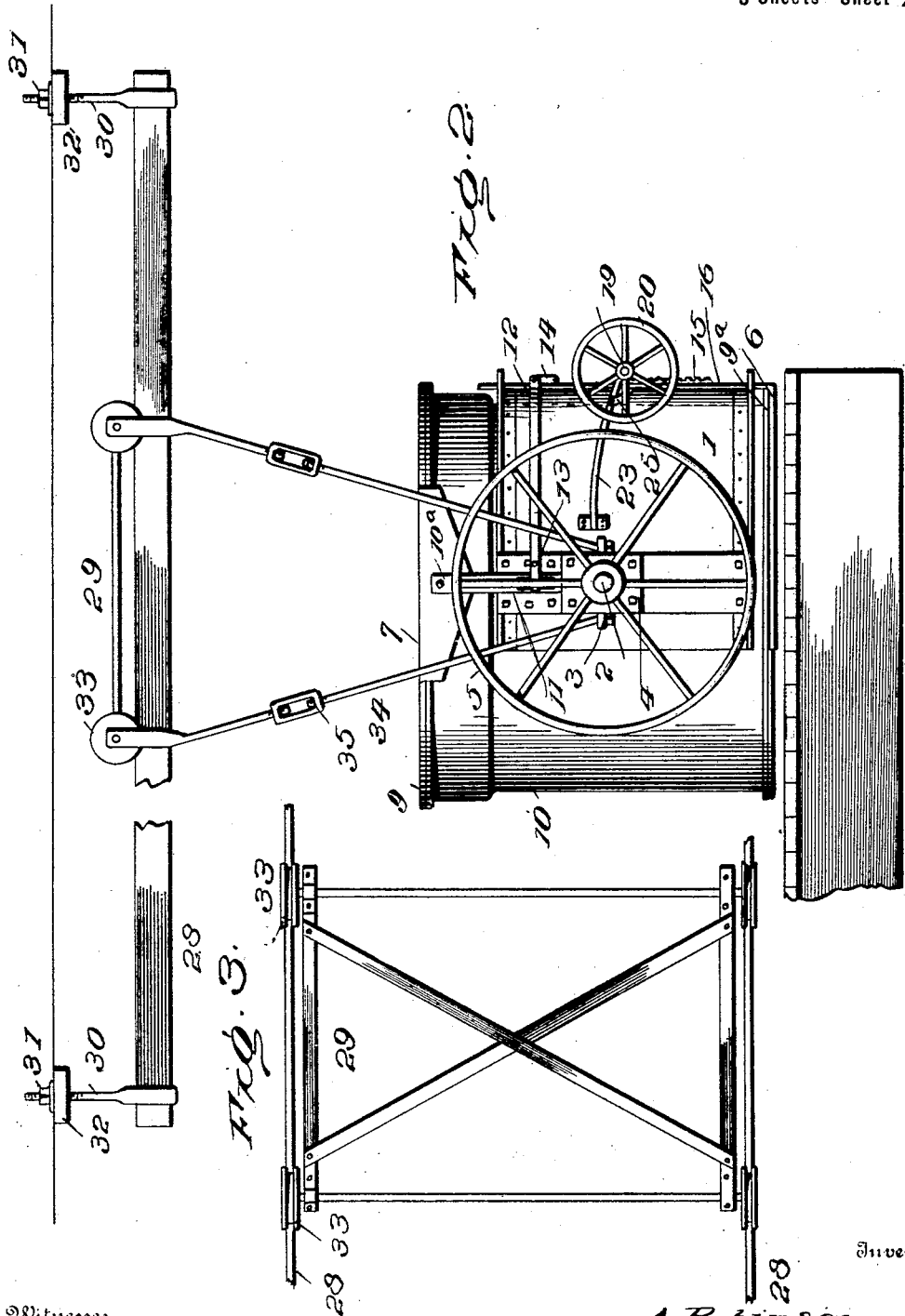
Witnesses
Inventor
A. Robinson
By
Attorneys No. 710,894. Patented Oct. 7, 1902.
A. ROBINSON.
APPARATUS FOR TURNING TERRA COTTA PIPES.
(Application filed Mar. 29, 1902.)
(No Model.) 3 Sheets—Sheet 3.

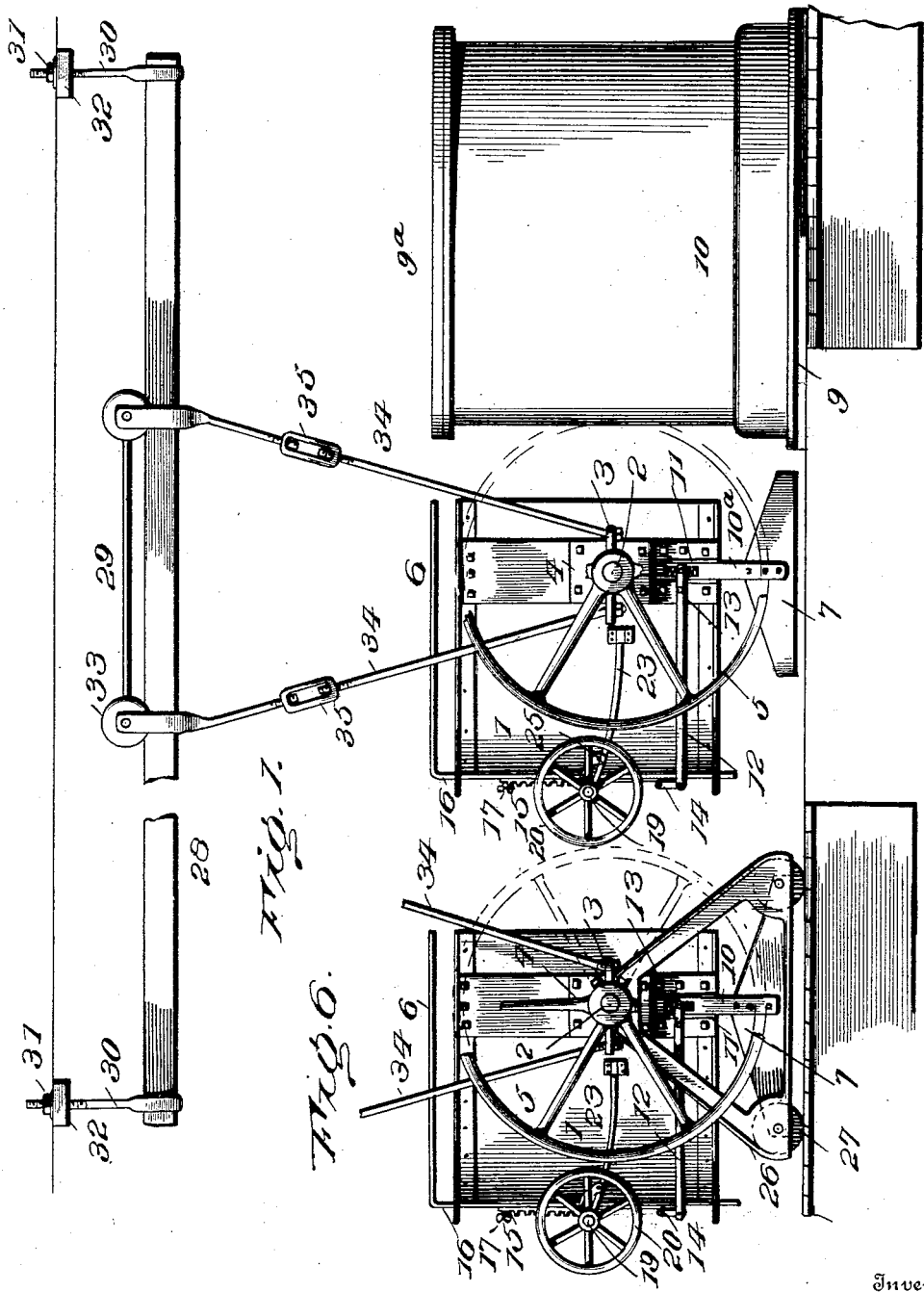

UNITED STATES PATENT OFFICE.

ANDREW ROBINSON, OF UHRICHSVILLE, OHIO.

APPARATUS FOR TURNING TERRA-COTTA PIPES.

SPECIFICATION forming part of Letters Patent No. 710,894, dated October 7, 1902.

Application filed March 29, 1902. Serial No. 100,616. (No model.)

*To all whom it may concern:*

Be it known that I, ANDREW ROBINSON, a citizen of the United States, residing at Uhrichsville, in the county of Tuscarawas and State of Ohio, have invented certain new and useful Improvements in Apparatus for Turning Terra-Cotta Pipes; and I do hereby declare the following to be a full, clear, and exact description of the invention, such as will enable others skilled in the art to which it appertains to make and use the same.

This invention relates to apparatus for mechanically handling and reversing pipes made of earthenware and similar material after the same have been pressed and during the trimming and finishing operations, the apparatus also serving to transport the pipe from the press to the elevator or other convenient point remote from the press, so as not to be in the way.

The invention provides an apparatus of the character aforesaid which can be used with different sizes of pipes by replacing a cradle of one size by means of a cradle of proper size conformable to the diameter of pipe to be handled.

In constructing the apparatus the following points govern and control, namely: simplicity of construction, compactness of arrangement, ease of operation, effectiveness, durability, and adaptation of the mechanism to different-sized pipes.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 4:
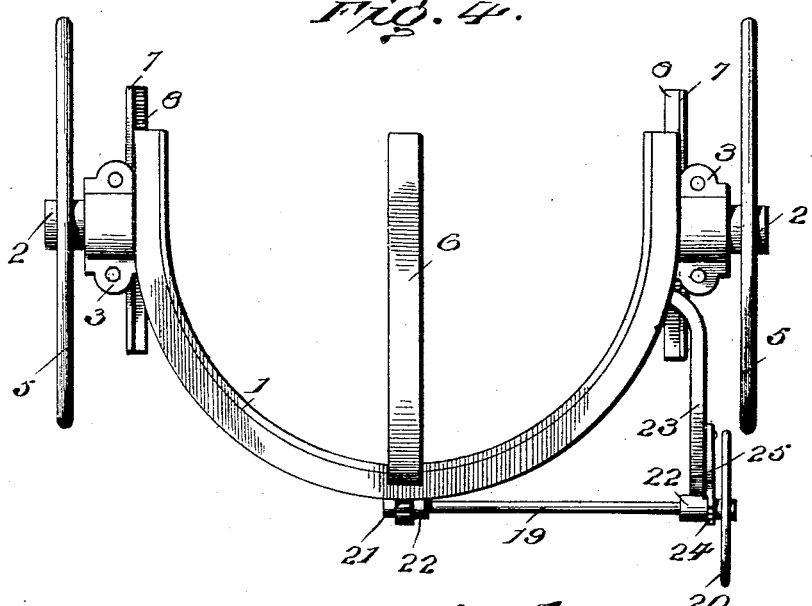
Figure 5:
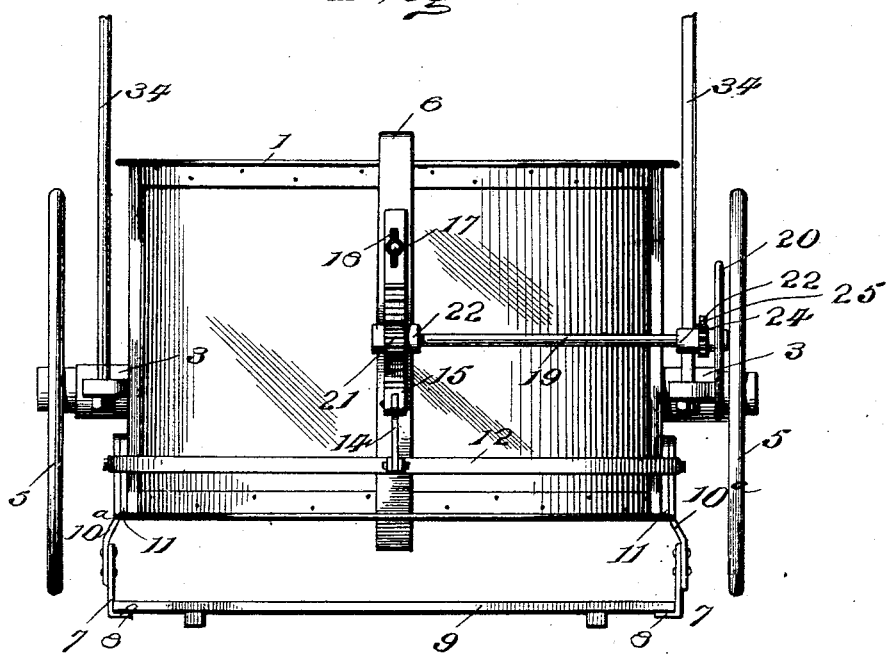

Figure 1 is a side elevation of an apparatus for handling sewer and like pipes constructed in accordance with and embodying the essential features of the invention. Fig. 2 is a view similar to Fig. 1, showing a length of pipe held in the cradle and reversed or turned end for end. Fig. 3 is a top plan view of the carrier or truck. Fig. 4 is a top plan view of the cradle and attached parts. Fig. 5 is a rear view. Fig. 6 is a side view of a modification, the truck being constructed to turn upon the floor or like surface.

Corresponding and like parts are referred to in the following description and indicated in all the views of the drawings by the same reference characters.

The cradle 1 is approximately of semicircular form in plan section and is of a length and diameter corresponding to the size of the pipe to be handled, a different-sized cradle being provided for each size of pipe. The cradle may be of any substantial construction and formed of any material best adapted for the purpose. Trunnions 2 project laterally from diametrically opposite sides of the cradle and are mounted in bearings 3, supported by means of a truck constructed to run either upon the floor or surface or an overhead track. The trunnions 2 form parts of or are applied to plates 4, which are bolted or otherwise rigidly attached to opposite sides of the cradle 1. Hand-wheels 5 are attached to the outer ends of the trunnions 2 to facilitate the turning of the cradle when it is required to reverse or turn the pipe.

Pipe-gripping means are fitted to the cradle and comprise jaws 6 and 7, the jaw 6 being centrally disposed at one end of the cradle and the jaw 7 being paired and located at the opposite end of the cradle, one at each side thereof. The jaw 6 extends across the space of the cradle, whereas the jaws 7 have inner flanges 8 to engage under opposite edges of the board 9, upon which the pipe 10 rests. Bars 10 project vertically from the jaws 7 and enter guides 11 at opposite sides of the cradle, so as to hold the jaws in place and direct them in their vertical movements. A forked lever 12 is fulcrumed at 13 to opposite sides of the cradle 1 by means of its side members and has loose connection with the bars 10 of the jaw 7. The stem of the forked lever 12 is connected, by means of a link 14, with a rack-bar 15, arranged at the rear side of the cradle and adjustably connected with an arm 16 of the jaw 6 by means of a clamp-bolt 17 passed through a slot 18 of the rack-bar 15 and having screw-thread connection with the arm 16. By connecting the jaws 6 and 7 in the manner stated they are adapted to have a simultaneous movement in opposite directions.

Suitable means are provided for operating the jaws and holding them in an adjusted position, particularly when the pipe 10 is clamped therebetween. As shown, these means consist of a shaft 19, journaled transversely in the rear of the cradle and provided at its outer end with a hand-wheel 20 and at its inner end with a pinion 21 to mesh with the teeth of the rack-bar 15 to effect a movement thereof. The shaft 19 is journaled at its inner end in a bearing 22, secured to the cradle at a central point and is mounted near its outer end in a bearing at the rear end of a bar 23, rigidly attached to a side of the cradle. The shaft 19 is held in an adjusted position by means of a ratchet-wheel 24, applied thereto, and a pawl 25, pivoted to the bar 23. Upon turning the shaft 19 to the right the jaws 6 and 7 are advanced to grip the pipe 10, and upon turning the shaft 19 to the left the said jaws separate and release the pipe, as will be readily comprehended.

The truck for supporting the cradle may be constructed either to run upon an overhead track or upon the floor or surface, as shown most clearly in Figs. 1, 2, 3, and 6, the latter showing the truck adapted to travel upon the floor and comprising side pieces 26, of approximately triangular form, and caster-wheels 27, the side pieces 26 being connected in any convenient way and provided at their upper ends with the bearings 3, in which the trunnions 2 are journaled. The overhead track comprises two rails 28, upon which the truck 29 is adapted to run, said rails being vertically adjustable by means of hangers 30, having their upper ends threaded and adapted to coöperate with nuts 31, resting upon supports 32 and adapted to be turned so as to move the hangers up or down, as may be required either to level the track or for any other desired purpose. The truck 29 comprises a frame suitably braced and caster-wheels 33, which are mounted to run upon the rails 28. Downwardly-convergent rods 34 are suspended from the corners of the truck 29 and support the bearings 3 and are adapted to be lengthened and shortened by means of turnbuckles 35 in the usual way. The cradle and its adjunctive parts are suspended from the truck 29 and are supported upon the truck illustrated in Fig. 6, and in both cases they are of like construction.

The pipe 10 when removed from the bars (not shown) is placed upon the board 9, and a similar board 9ª is placed upon the upper end of the pipe when it is required to turn the latter to trim the lower end after the upper end has been trimmed. The truck is advanced to bring the cradle 1 in close contact with the pipe, after which the shaft 19 is turned to advance the jaws 6 and 7 to clamp the boards 9 and 9ª against the ends of the pipe and at the same time raise the latter to admit of its movement with the carrier when moved upon its truck. An opening is formed in the floor, and when the cradle with the pipe reaches a point directly above the opening in the floor the said pipe is turned by operating one or both of the hand-wheels 5, the construction being such as to admit of the turning of the pipe in the length of its own space. After the pipe has been turned the truck is moved to a position at one side of the opening in the floor and the pipe is released and finished by trimming the upper end, after which it is again caught up by the cradle and carried off to the elevator (not shown) or to any convenient point by means of the truck, as will be readily understood.

Having thus described the invention, what is claimed as new is—

1. In apparatus for turning and handling pipe, a track, adjustable supports for the track, a truck mounted to travel upon the track, bearings, adjustable connections between the bearings and truck, a cradle journaled in said bearings, and means applied to the cradle for gripping the pipe, substantially as specified.

2. In apparatus for handling and turning pipe, a cradle, a forked lever fulcrumed to the cradle, jaws connected with the side members of the forked lever and adapted to engage with and support the pipe, and means applied to the cradle for operating the lever and holding it in an adjusted position, substantially as set forth.

3. In combination, a cradle provided at opposite sides with vertical guides, jaws at the sides of one end of the cradle and having extensions coöperating with the said guides, a forked lever fulcrumed to the cradle and having connection with the extensions of the jaws, and means for coöperating with the said lever for actuation thereof and holding it in an adjusted position, substantially as specified.

4. In combination, a cradle, jaws at the sides of one end of the cradle having inner flanges or extensions for supporting the pipe, a forked lever fulcrumed to the cradle and supporting said jaws, and means applied to the cradle for operating the said forked lever and holding it in an adjusted position, substantially as set forth.

5. In combination, a cradle, a jaw at one end of the cradle and having an arm extended along the rear side of the cradle, coöperating jaws at the opposite end of the cradle, a forked lever fulcrumed to the cradle and supporting the last-mentioned jaws, a rack-bar connected with the forked lever and having adjustable connection with the arm of the first-mentioned jaw, and a shaft having a pinion in mesh with the teeth of said rack-bar, substantially as set forth.

6. In combination, a cradle, a jaw at one end of the cradle having an arm extended therefrom along the rear side of the cradle, companion jaws at the opposite end of the cradle, a lever fulcrumed to the cradle and supporting the companion jaws, a rack-bar connecting the said lever and arm, a shaft having a pinion in mesh with the rack-bar, and means for holding the shaft and jaws in an adjusted position, substantially as set forth.

In testimony whereof I affix my signature in presence of two witnesses.

ANDREW ROBINSON. [L. S.]

Witnesses:
E. B. HEALEA,
T. D. HEALEA.